United States Patent
Jung

(10) Patent No.: US 9,236,718 B2
(45) Date of Patent: Jan. 12, 2016

(54) UNWELDED EXPLOSION-PROOF DRAIN CABLE GLAND ASSEMBLY

(71) Applicant: SEUNG JIN IND. CO., LTD, Ansan-si, Gyeonggi-do (KR)

(72) Inventor: Ho Jin Jung, Siheung-si (KR)

(73) Assignee: SEUNG JIN IND. CO., LTD, Gyeonggi-Do (KR)

( * ) Notice: Subject to any disclaimer, the term of this patent is extended or adjusted under 35 U.S.C. 154(b) by 142 days.

(21) Appl. No.: 14/217,495

(22) Filed: Mar. 18, 2014

(65) Prior Publication Data

US 2015/0069750 A1  Mar. 12, 2015

(30) Foreign Application Priority Data

Sep. 12, 2013 (KR) .................. 10-2013-0109632

(51) Int. Cl.
 *F16L 17/00* (2006.01)
 *H02G 3/04* (2006.01)
 *H02G 3/06* (2006.01)

(52) U.S. Cl.
 CPC ........... *H02G 3/0412* (2013.01); *H02G 3/0675* (2013.01)

(58) Field of Classification Search
 USPC .......... 285/354, 356, 357, 924, 13, 14, 151.1, 285/353, 384, 222.1–222.5, 245, 246
 See application file for complete search history.

(56) References Cited

U.S. PATENT DOCUMENTS

| | | | | |
|---|---|---|---|---|
| 2,044,335 A * | 6/1936 | Schulthess | ............ | F16L 33/224 285/250 |
| 2,226,039 A * | 12/1940 | Wiltse | .................... | F16L 19/00 285/222.4 |
| 2,503,826 A * | 4/1950 | Lamont | .................... | F16L 19/10 285/340 |
| 2,687,904 A * | 8/1954 | Tornblom | ............... | F16L 33/26 285/222.4 |
| 2,733,080 A * | 1/1956 | Gill | ......................... | B05B 3/026 285/110 |
| 2,805,873 A * | 9/1957 | Brennan | ................ | F16L 19/06 285/317 |
| 2,848,254 A * | 8/1958 | Millar | ..................... | F16L 33/26 285/222.5 |
| 2,857,178 A * | 10/1958 | Mitchell | ................. | F16L 13/08 285/22 |
| 3,877,734 A * | 4/1975 | Brozek | ................... | F16L 33/01 285/249 |
| 4,614,372 A * | 9/1986 | Gschwind | ............... | F16L 47/04 285/250 |
| 4,858,959 A * | 8/1989 | Parrow | ............... | F02M 37/0017 210/532.1 |
| 5,088,774 A * | 2/1992 | Spiegelman | .......... | F16L 39/005 285/123.1 |
| 6,543,815 B2 * | 4/2003 | Suzuki | ................... | F16L 47/04 285/331 |
| 8,794,677 B2 * | 8/2014 | Halaczkiewicz | .... | F16L 19/0225 285/14 |
| 2006/0163872 A1 * | 7/2006 | Norman | ................ | F16L 19/065 285/245 |

(Continued)

FOREIGN PATENT DOCUMENTS

KR 10-0988279 B1 10/2010
KR 10-0988284 B1 10/2010

*Primary Examiner* — Aaron Dunwoody
(74) *Attorney, Agent, or Firm* — Revolution IP, PLLC

(57) ABSTRACT

An unwelded explosion-proof drain cable gland assembly includes: a gland nut that is disposed on an outer circumference of a flexible tube and has a seat protruding inward; a gland having a cylindrical compression pin part that is formed at an upper portion thereof, an annular flange that is formed integrally with the compression pin part and protruding in a radial outward direction, and a binding part that is integrally formed under the flange and is inserted into and bound to the flexible tube; a gland washer that is installed in front of the gland and comes into surface contact with an upper surface of the compression pin part; a rubber packing that is disposed in front of the gland washer and has a hollow interior; and a coupling into which the rubber packing is fitted and whose outer surface is threaded to be coupled with the gland nut.

10 Claims, 6 Drawing Sheets

(56) References Cited

U.S. PATENT DOCUMENTS

| | | | |
|---|---|---|---|
| 2006/0284416 A1* | 12/2006 | Tarquini | F16L 19/061 285/272 |
| 2007/0176413 A1* | 8/2007 | Lucas | F16L 25/0072 285/55 |
| 2009/0026757 A1* | 1/2009 | Borland | F16L 9/12 285/31 |
| 2013/0113209 A1* | 5/2013 | Neal | F16L 33/18 285/354 |

\* cited by examiner

UNWELDED EXPLOSION-PROOF DRAIN CABLE GLAND ASSEMBLY

CROSS-REFERENCE TO RELATED APPLICATION

This application claims priority to and the benefit of Korean Patent Application No. 2013-0109632, filed on Sep. 12, 2013, the disclosure of which is incorporated herein by reference in its entirety.

BACKGROUND

1. Field of the Invention

The present invention relates to an unwelded explosion-proof drain cable gland assembly and, more particularly, to an unwelded explosion-proof drain cable gland assembly in which an end of a flexible tube assembly for protecting electric wires is coupled with a cable gland without welding, thereby making it possible to improve workability and to considerably reduce the number of components.

2. Discussion of Related Art

As the prior art of the present invention, for example, Korean Patent No. 1198331 (hereinafter referred to as "Patent Document 1") issued to the applicant of the present invention has been published.

In Patent Document 1, an unwelded coupling device (corresponding to the cable gland of the present invention) of a flexible tube, capable of preventing corrosion of a joint using an assembling process rather than an existing welding process, is disclosed. According to the unwelded coupling device, it is possible to provide a beautiful appearance of a finished flexible tube product, to improve work efficiency due to removal of the welding process, and to provide a simple assembly structure to increase assembly efficiency and reduce a production cost.

Although the unwelded coupling device disclosed in Patent Document 1 does not have any problems, studies have been continually made to provide consumers with a new product capable of providing higher safety and more merits in the viewpoint of a manufacturer.

DOCUMENTS OF PRIOR ART (Patent Document 1) Korean Patent No. 10-1198331
(Patent Document 2) Korean Patent Application No. 10-2013-0092510 (applicant: Seung Jin Ind. Co. Ltd.)

SUMMARY OF THE INVENTION

The present invention is directed to an unwelded explosion-proof drain cable gland assembly that is mounted on an end of a flexible tube assembly using an unwelded assembling process rather than an existing welding process, thereby making it possible to improve workability, to considerably reduce the number of components, and to suppress use of lead harmful to a human body.

The present invention is also directed to an unwelded explosion-proof drain cable gland assembly in which, when a gas pressure is increased in a flexible tube assembly, a gas in the flexible tube assembly can be smoothly discharged to the outside through a gas discharge path by a difference with an external pressure (e.g. atmospheric pressure), and be prevented from being propagated to interiors of other surrounding flexible tube assemblies or pipes connected by a cable gland.

The present invention is also directed to an unwelded explosion-proof drain cable gland assembly that supports electric wires or cables inserted into a flexible tube assembly so as not to move in the flexible tube assembly, and prevents the electric wires or cables from being easily pulled in a direction in which a force (withdrawal force) is applied when pulled in a forward/backward direction of the flexible tube assembly.

According to an aspect of the present invention, there is provided an unwelded explosion-proof drain cable gland assembly, which includes: a gland nut that is disposed on an outer circumference of a flexible tube and has a seat protruding inward; a gland having a cylindrical compression pin part that is formed at an upper portion thereof, an annular flange that is formed integrally with the compression pin part and protruding in a radial outward direction, and a binding part that is integrally formed under the flange and is inserted into and bound to the flexible tube; a gland washer that is installed in front of the gland and comes into surface contact with an upper surface of the compression pin part; a rubber packing that is disposed in front of the gland washer and has a hollow interior; and a coupling into which the rubber packing is fitted and whose outer surface is threaded to be coupled with the gland nut.

Here, the binding part of the gland may include a plurality of grooves into which O-rings for sealing are fitted and which are formed in an outer circumferential surface thereof, and a plurality of annular ridges that increase a binding force and are formed on the outer circumferential surface thereof.

Further, the flexible tube and the binding part of the gland may be compressed and coupled by a band ring.

According to another aspect of the present invention, there is provided an unwelded explosion-proof drain cable gland assembly, which includes: a gland nut that is disposed on an outer circumference of a flexible tube and has a seat protruding inward; a slip bushing that has an annular flange caught on the seat of the gland nut and a binding part inserted into and bound to the flexible tube, and has a T-shaped cross section; a gland that has a cylindrical shape, is installed in front of the slip bushing, and comes into surface contact with the slip bushing; a gland washer that is installed in front of the gland and comes into surface contact with an upper surface of the gland; a rubber packing that is disposed in front of the gland washer and has a hollow interior; and a coupling into which the rubber packing is fitted and whose outer surface is threaded to be coupled with the gland nut.

Here, the slip bushing may include a plurality of grooves into which O-rings for sealing are fitted and which are formed in an outer circumferential surface thereof, and a plurality of annular ridges that increase a binding force and are formed on the outer circumferential surface thereof.

Further, the flexible tube and the binding part of the slip bushing may be compressed and coupled by a band ring.

According to the unwelded explosion-proof drain cable gland assembly of the present invention, the following effects can be obtained.

(i) Since the cable gland is mounted on an end of the flexible tube assembly in an unwelded assembling process, a corrosion problem of a joint in an existing welding process can be solved.

(ii) Since each component constituting the cable gland is assembled by screwing or fitting, disassembly is possible as needed, and maintenance is easy.

(iii) Since the end (joint) of the flexible tube assembly on which the cable gland is mounted is not welded, a finished product having a beautiful appearance can be obtained.

(iv) Since the unwelded explosion-proof drain cable gland assembly can be mass-produced by simple assembly work rather than welding work that requires a high skill and undergoes a high defect rate, it is possible to improve productivity and reduce a production cost and a defect rate.

(v) When a pressure of a gas in the flexible tube assembly is higher than an ambient pressure (e.g. atmospheric pressure), the gland nut fitted into the end of the flexible tube assembly first and the gland disposed inside the gland nut among the components constituting the cable gland provide a gas discharge path along which the gas is smoothly discharged to the outside by an amount corresponding to a differential pressure. As such, it is possible to prevent the flexible tube assembly from being ruptured due to an excessively high internal pressure.

(vi) Since a restriction plate for pressing electric wires are assembled to the gland whose circumference is partly removed in a disassemblable type, the electric wires or cables can be fixed in the flexible tube assembly without unintended movement. Even when a force pulling the electric wires or cables is applied in a forward/backward direction of the flexible tube assembly, the electric wires or cables can be prevented from being pulled out in a direction in which the force is applied.

(vii) Since the packing among the components constituting the cable gland is formed of a rubber, the rubber packing comes into close contact with surfaces of the electric wires or cables when the electric wires or cables pass through the packing. As such, the gas can be prevented from being propagated from the flexible tube assembly coupled with the cable gland to an interior of another flexible tube assembly or another pipe.

Meanwhile, other effects not mentioned above will be sufficiently understood or expected by those skilled in the art from the following embodiments.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

An unwelded explosion-proof drain cable gland assembly according to various embodiments of the present invention will be described in detail below with reference to the accompanying drawings.

First Embodiment

Figure 1:
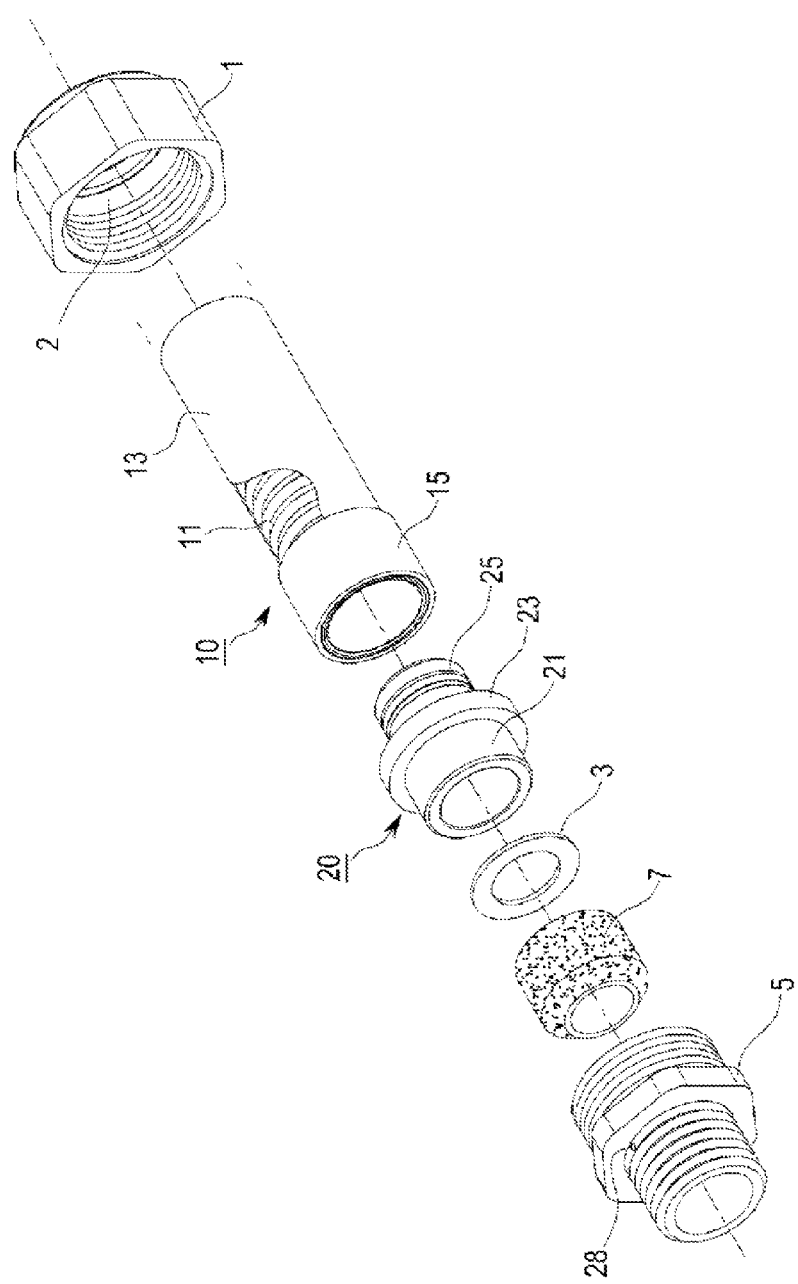
FIG. 1 is an exploded perspective view showing an unwelded explosion-proof drain cable gland assembly according to a first embodiment of the present invention.
Figure 2:
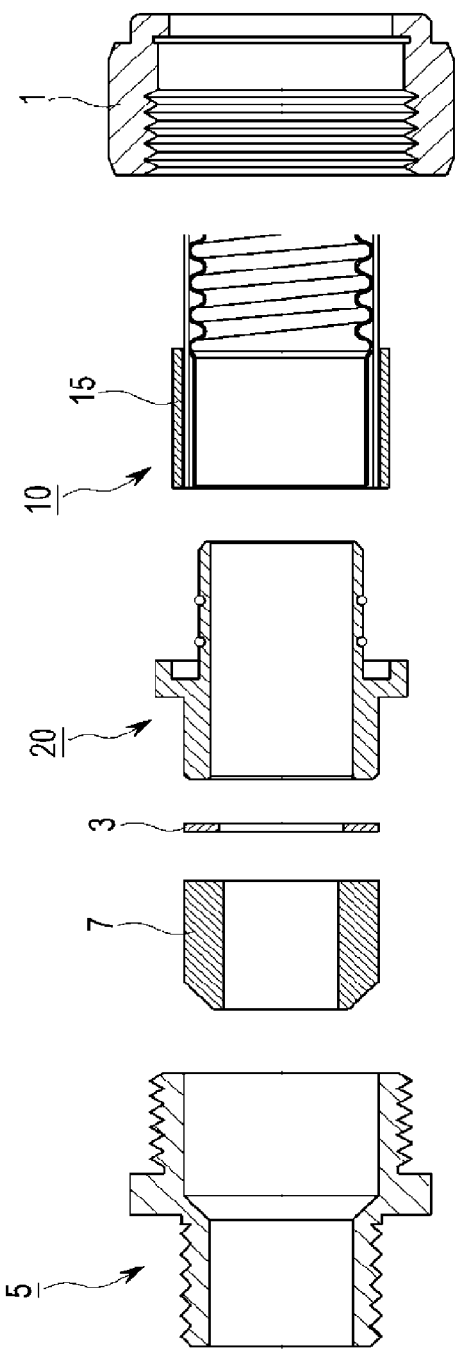
FIG. 2 is an exploded cross-sectional view of FIG. 1.
Figure 3:
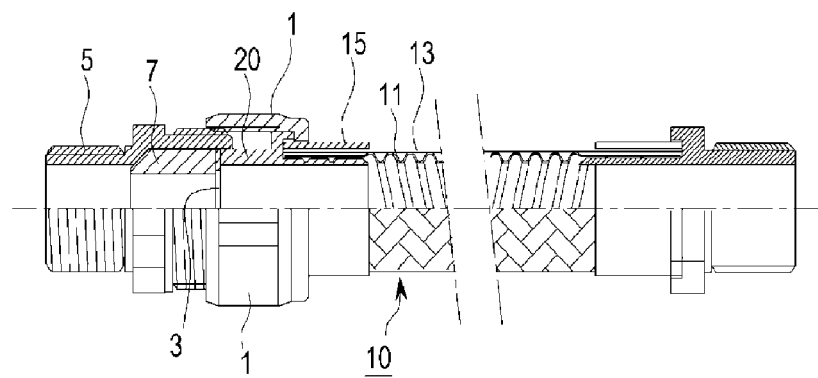
FIG. 3 is a half cross-sectional view showing the unwelded explosion-proof drain cable gland assembly according to the first embodiment of the present invention.

FIG. 1 is an exploded perspective view showing an unwelded explosion-proof drain cable gland assembly according to a first embodiment of the present invention. FIG. 2 is an exploded cross-sectional view of FIG. 1. FIG. 3 is a half cross-sectional view showing the unwelded explosion-proof drain cable gland assembly according to the first embodiment of the present invention.

As shown in FIGS. 1 to 3, an unwelded explosion-proof drain cable gland assembly according to a first embodiment of the present invention gives the gist that a gland 20 is coupled to a flexible tube 10 in an unwelded type.

The flexible tub 10 is configured so that a braid 13 woven by a metal is wrapped around an outer circumferential surface of a bellows 11. An interlock type tube may be used in place of the bellows 11.

A gland nut 1 is fitted around the flexible tube 10. Afterwards, the gland nut 1 is screwed to a coupling 5.

A gland 20 is partly inserted into the flexible tube 10, and is then compressed and coupled to the flexible tube 10 without welding by a band ring 15.

The gland 20 includes a compression pin part 21 formed at an upper portion thereof, an annular flange 23 that is formed integrally with the compression pin part 21 and protruding in a radial outward direction, and a binding part 25 that is formed under the flange 23 and is inserted into and bound to the flexible tube 10.

The compression pin part 21 has a cylindrical structure, and compresses a rubber packing 7 to be described below. Further, the annular flange 23 formed integrally with the compression pin part 21 is caught on a seat 2 protruding inward from the gland nut 1 so as to restrict movement of the gland nut 1. The binding part 25 formed integrally under the flange 23 is inserted into the flexible tube 10, compresses the band ring 15, and is thereby coupled with the flexible tube 10.

Figure 4:
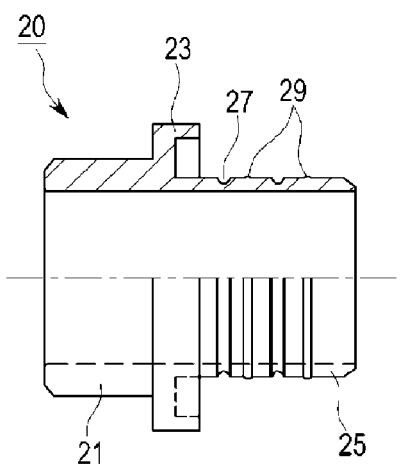
FIG. 4 is an enlarged half cross-sectional view showing a compression pin part in the unwelded explosion-proof drain cable gland assembly according to the first embodiment of the present invention.

As shown in FIG. 4, the binding part 25 is provided with a plurality of grooves 27, into which O-rings for sealing are fitted, in an outer circumferential surface thereof. Further, the outer circumferential surface of the binding part 25 is provided with a plurality of annular ridges 29 for increasing a binding force when coupled with the flexible tube 10 by compression.

The plurality of annular ridges 29 serve as wedges. As such, when compressing the band ring 15, the annular ridges 29 can greatly improve the binding force with respect to the flexible tube 10.

A gland washer 3, which is in surface contact with an upper surface of the compression pin part 21, is mounted in front of the gland 20. A high-pressure gas remaining inside the flexible tube is discharged to a gap between the compression pin part 21 of the gland 20 and the gland washer 3 at a small amount. Due to the discharge of the high-pressure gas, an internal pressure of the flexible tube is adjusted to some extent. Thus, an explosion-proof function can be obtained.

Further, the rubber packing 7 is disposed in front of the gland washer 3. The rubber packing 7 is inserted into the coupling 5. The rubber packing 7 has a hollow cylindrical shape.

The rubber packing 7 is formed such that a wall through which electric wires pass has a small thickness. Thus, when inserted during actual work, the electric wires can easily pass through the rubber packing 7. When the rubber packing 7 is compressed by screwing the gland nut 1 to the coupling 5, an outer wall of the rubber packing 7 is expanded outward, and an inner wall of the rubber packing 7 is expanded inward. Thus, the electric wires inserted into the rubber packing 7 can be firmly fixed by the expansion of the rubber packing, and an airtight function can be obtained to prevent gas leakage.

Further, a small hole 28 is bored in an outer circumference of the coupling 5 which is fastened to a counterpart so as to be able to naturally drain condensed water or dew condensation water to the outside.

Hereinafter, an operation of the unwelded explosion-proof drain cable gland assembly according to the first embodiment of the present invention will be described.

In a state in which the gland 20 is coupled to the flexible tube 10 in an unwelded type by the band ring 15, the rubber packing 7 is inserted into the coupling 5, and the gland washer 3 is disposed between the rubber packing 7 and the gland 20. Then, the gland nut 1 is screwed to the coupling 5. Thereby, the seat 2 of the gland nut 1 pushes the flange 23 of the gland 20, and the compression pin part 21 of the gland 20 comes into surface contact with an inner circumferential surface of the coupling 5, and thereby pushes the gland washer 3 and the rubber packing 7.

Here, the rubber packing 7 is compressed in a lengthwise direction, and is expanded in radial inward and outward directions. As such, the electric wires can be firmly tightened and fixed inside the rubber packing 7, and airtightness with the inner circumferential surface of the coupling 5 can be maintained outside the rubber packing 7.

Further, the internal high-pressure gas is discharged to the gap between the upper surface of the compression pin part 21 of the gland 20 and the gland washer 3 at a small amount, thereby reducing the internal pressure.

Figure 5:
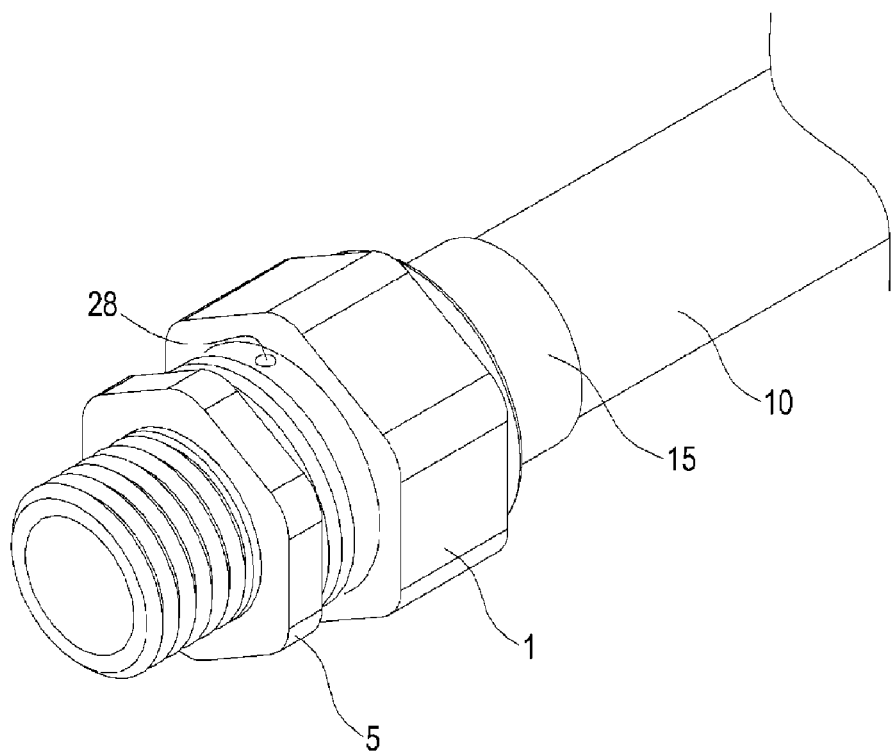
FIG. 5 is a perspective view showing an assembled state of the unwelded explosion-proof drain cable gland assembly according to the first embodiment of the present invention.
Figure 6:
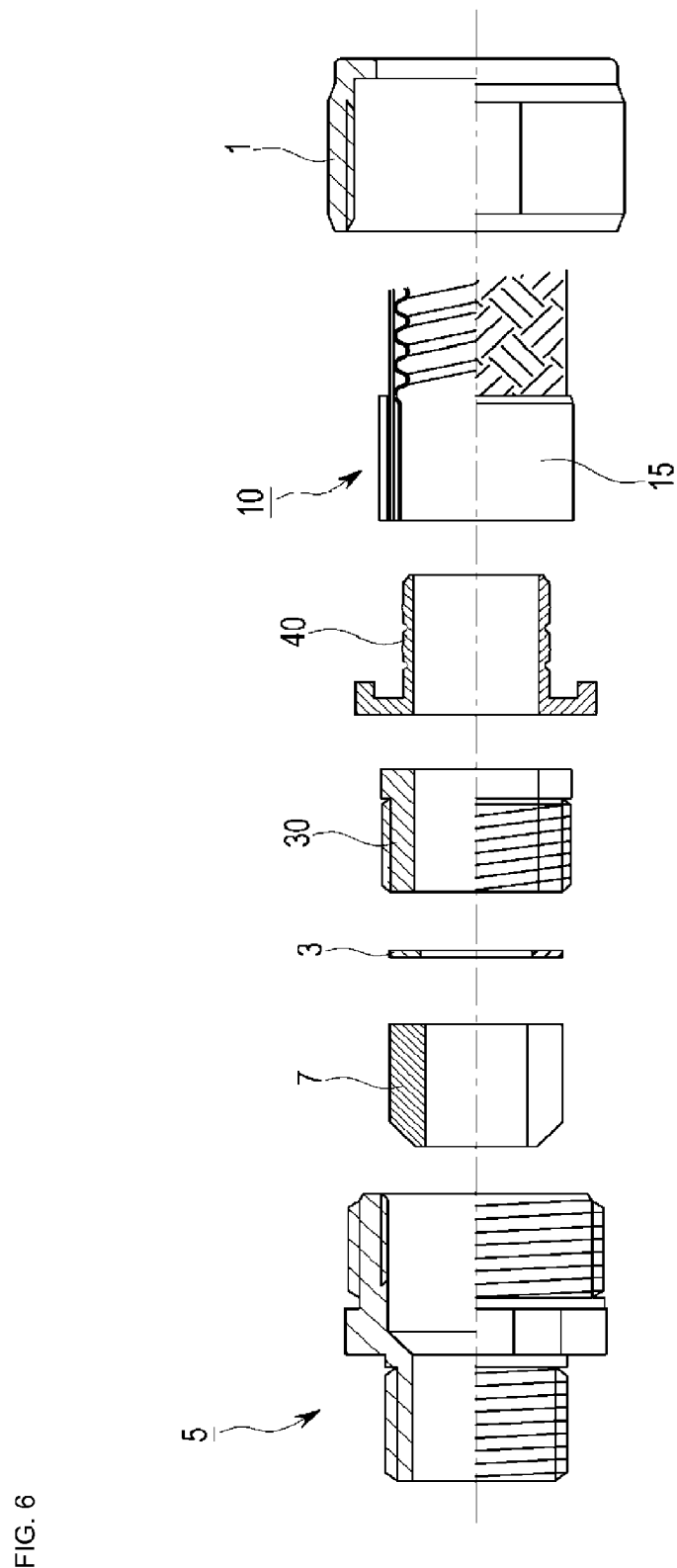
FIG. 6 is an exploded cross-sectional view showing an unwelded explosion-proof drain cable gland assembly according to a second embodiment of the present invention.

A completely assembled state of the unwelded explosion-proof drain cable gland assembly according to the first embodiment of the present invention is shown in FIG. 5.

Second Embodiment

An unwelded explosion-proof drain cable gland assembly according to a second embodiment of the present invention is the same as that according to the first embodiment of the present invention except that the gland is replaced with other components. Thus, the same components as the first embodiment of the present invention will be no longer described.

Figure 7:
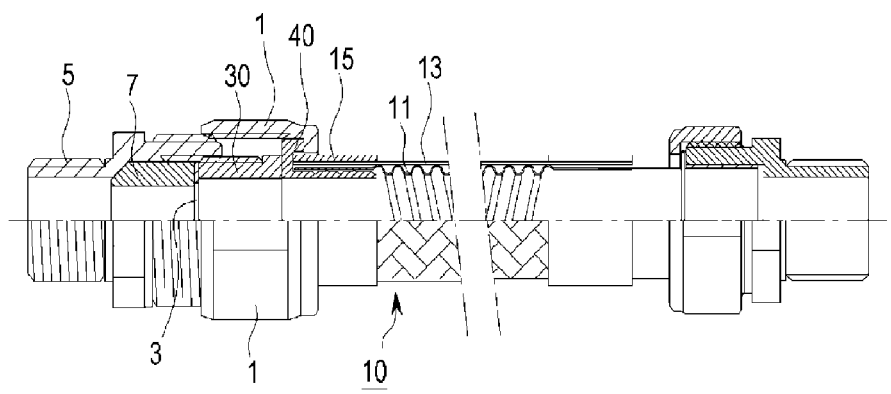
FIG. 7 is a half cross-sectional view showing the unwelded explosion-proof drain cable gland assembly according to the second embodiment of the present invention.

As shown in FIG. 7, in the second embodiment of the present invention, a cylindrical gland 30 and a slip bushing 40 are provided as separate components.

In detail, the cylindrical gland 30 functions to compress a rubber packing 7 via a gland washer 3. The slip bushing 40 is inserted into a flexible tube 10, is compressed by a band ring 15, and is thereby coupled to the flexible tube 10 in an unwelded type.

Figure 8:
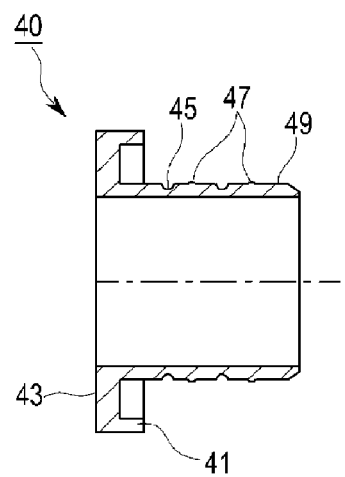
FIG. 8 is an enlarged half cross-sectional view showing a slip bushing in the unwelded explosion-proof drain cable gland assembly according to the first embodiment of the present invention.

As shown in FIG. 8, the slip bushing 40 has a T-shaped cross section, and includes an annular flange 43 whose stepped edge 41 is caught on a seat of a gland nut 1 so as to prevent additional movement. Further, the flange 43 of the slip bushing has a flat surface so as to be able to compress the gland 30 while coming into surface contact with the gland 30 in a forward direction. The slip bushing 40 has a binding part 49 that is inserted into and bound to the flexible tube 10.

The binding part 49 of the slip bushing 40 is provided with a plurality of grooves 45, into which O-rings for sealing are fitted, in an outer circumferential surface thereof. Further, the outer circumferential surface of the binding part 49 is provided with a plurality of annular ridges 47 for increasing a binding force when coupled with the flexible tube 10 by compression.

An operation of the second embodiment of the present invention is equal or similar to that of the first embodiment of the present invention, and thus detailed description will not be made.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An unwelded explosion-proof drain cable gland assembly in which a gland is coupled to a flexible tube in an unwelded type, comprising:
    a gland nut that is disposed on an outer circumference of the flexible tube and has a seat protruding inward;
    the gland having a cylindrical compression pin part that is formed at an upper portion thereof, an annular flange that is formed integrally with the compression pin part and protruding in a radial outward direction, and a binding part that is integrally formed under the flange and is inserted into and bound to the flexible tube;
    a gland washer that is installed in front of the gland and comes into surface contact with an upper surface of the compression pin part;
    a rubber packing that is disposed in front of the gland washer and has a hollow interior; and
    a coupling into which the rubber packing is fitted and whose outer surface is threaded to be coupled with the gland nut.

2. The unwelded explosion-proof drain cable gland assembly of claim 1, wherein the binding part of the gland includes;
    a plurality of grooves into which O-rings for sealing are fitted and which are formed in an outer circumferential surface thereof; and
    a plurality of annular ridges that increase a binding force and are formed on the outer circumferential surface thereof.

3. The unwelded explosion-proof drain cable gland assembly of claim 1, wherein the flexible tube and the binding part of the gland are compressed and coupled by a band ring.

4. An unwelded explosion-proof drain cable gland assembly in which a gland is coupled to a flexible tube in an unwelded type, comprising:
    a gland nut that is disposed on an outer circumference of the flexible tube and has a seat protruding inward;
    a slip bushing that has an annular flange caught on the seat of the gland nut and a binding part inserted into and bound to the flexible tube, and has a T-shaped cross section;
    the gland that has a cylindrical shape, is installed in front of the slip bushing, and comes into surface contact with the slip bushing;
    a gland washer that is installed in front of the gland and comes into surface contact with an upper surface of the gland;
    a rubber packing that is disposed in front of the gland washer and has a hollow interior; and
    a coupling into which the rubber packing is fitted and whose outer surface is threaded to be coupled with the gland nut.

5. The unwelded explosion-proof drain cable gland assembly of claim 4, wherein the slip bushing includes
   a plurality of grooves into which O-rings for sealing are fitted and which are formed in an outer circumferential surface thereof; and
   a plurality of annular ridges that increase a binding force and are formed on the outer circumferential surface thereof.

6. The unwelded explosion-proof drain cable gland assembly of claim 4, wherein the flexible tube and the binding part of the slip bushing are compressed and coupled by a band ring.

7. The unwelded explosion-proof drain cable gland assembly of claim 1, wherein the coupling has a small hole bored in an outer circumference thereof which is fastened to a counterpart so as to drain condensed water or dew condensation water to an outside.

8. The unwelded explosion-proof drain cable gland assembly of claim 2, wherein the flexible tube and the binding part of the gland are compressed and coupled by a band ring.

9. The unwelded explosion-proof drain cable gland assembly of claim 5, wherein the flexible tube and the binding part of the slip bushing are compressed and coupled by a band ring.

10. The unwelded explosion-proof drain cable gland assembly of claim 4, wherein the coupling has a small hole bored in an outer circumference thereof which is fastened to a counterpart so as to drain condensed water or dew condensation water to an outside.

* * * * *